United States Patent [19]

Ishii

[11] Patent Number: 5,134,507
[45] Date of Patent: Jul. 28, 1992

[54] LIQUID CRYSTAL DISPLAY APPARATUS HAVING A PARTICULAR OPTICAL COMPENSATING MEMBER

[75] Inventor: Yutaka Ishii, Nara, Japan

[73] Assignee: Sharp Kabushiki Kaisha, Osaka, Japan

[21] Appl. No.: 377,961

[22] Filed: Jul. 11, 1989

[30] Foreign Application Priority Data

Jul. 12, 1988 [JP] Japan .................. 63-174219

[51] Int. Cl.$^5$ .......................................... G02F 1/135
[52] U.S. Cl. ......................................... 359/94; 359/93; 359/73
[58] Field of Search ................. 350/347 R, 347 V; 359/73, 93, 94

[56] References Cited

U.S. PATENT DOCUMENTS

| | | | |
|---|---|---|---|
| 4,385,806 | 5/1983 | Fergason | 350/347 R |
| 4,408,839 | 10/1983 | Wiener-Avnear | 350/347 R |
| 4,436,379 | 3/1984 | Funada et al. | 350/350 R |
| 4,443,065 | 4/1984 | Funada et al. | 350/347 R |
| 4,466,702 | 8/1984 | Wiener-Avnear et al. | 350/347 R |
| 4,844,569 | 7/1989 | Wada et al. | 350/347 R |
| 4,909,606 | 3/1990 | Wada et al. | 350/347 R |
| 4,936,654 | 6/1990 | Suzaki et al. | 350/347 E |

FOREIGN PATENT DOCUMENTS

| | | |
|---|---|---|
| 246842 | 11/1987 | European Pat. Off. . |
| 0311339 | 4/1989 | European Pat. Off. . |
| 311339 | 4/1989 | European Pat. Off. . |
| 0312297 | 4/1989 | European Pat. Off. .......... 350/347 R |
| 0151924 | 6/1988 | Japan ............................. 350/347 R |
| 63-271415 | 11/1988 | Japan . |

Primary Examiner—William Mintel
Assistant Examiner—S. V. Clark

[57] ABSTRACT

A twisted nematic liquid crystal display apparatus rotates the plane of polarization of the light with optical rotatory power of a liquid crystal layer. Thereby, a display operation is made by switching pass/interruption of the light by use of a pair of polarizers sandwiching the liquid crystal layer. At this time, by associating an optical compensating member whose optical anisotropy is in the opposite characteristic with a liquid crystal display device, leakage of light and coloration caused by birefringence and optical rotary dispersion in the liquid crystal layer are prevented. Further, the switching characteristic of the light over the entire visible light region is enhanced, and color display is of a high contrast ratio. Since the optical compensating member is formed of laminated and adhered plural synthetic resin films which are extended monoaxially, and twisted in the opposite direction to the twisting direction of the liquid crystal molecule on the plane, including the extending direction, the quality of display may be improved without deterioration of the advantages of the existing liquid crystal display apparatus, such as those of small size and portability.

5 Claims, 4 Drawing Sheets

LIQUID CRYSTAL DISPLAY APPARATUS HAVING A PARTICULAR OPTICAL COMPENSATING MEMBER

BACKGROUND OF THE INVENTION

1. Field of the Invention

This invention relates to a liquid crystal display apparatus for use in various information display terminal units and image display units. More particularly, it relates to a liquid crystal display apparatus for monochromatic display without coloration and for color display high in display contrast ratio (the ratio of quantity of transmitted light per unit area of the liquid crystal layer between when applied with voltage and when not applied).

2. Description of the Prior Art

The liquid crystal display apparatus is used in a wide variety of fields, including the watch, pocket calculator, computer terminal, word processor display, television, and others. More recently, there have been increased demands for multi-color and full-color displays of the liquid crystal display apparatus. They have already been realized in the fields of graphic display and image display. The color display widely realized at the present is that involving a method of installing color filter layers inside the liquid crystal cells, and developing colors by switching of the light by means of the liquid crystal cells. The mainstream of the display mode of this method is the twisted nematic (TN) display mode in which the axial direction of liquid crystal molecules is twisted by 90 degrees in consideration of the contrast, etc.

In the liquid crystal cells using the liquid crystals of the TN display mode, the dependency of the transmitted light of liquid crystal cell on the wavelength is large. Hence, uniform switching of the light over the entire visible light region is impossible. In other words, in a liquid crystal display apparatus for color display, for example, where color filters of red, green and blue color are formed in patterns on one of the substrates of the liquid crystal cell, since the intensity of transmitted light passing through each color filter is not uniform, a favorable color display cannot be made. In particular, in the liquid crystal cell of the so-called normally-closed type, in which the light is shielded when voltage is not applied to the liquid crystal layer, with planes of polarization of two polarizer being set parallel to each other, leakage of light and coloration of transmission light, when not applied with voltage, become obvious.

In the case of color liquid crystal display apparatus for switching the light by using the TN display mode having such color filter layers, the liquid crystal driving methods may be roughly classified into two systems. One is the so-called active matrix driving system in which nonlinear elements such as diodes, or switching elements such as thin-film transistors, are disposed on each picture element of liquid crystal cell. The other is the direct-multiplexed driving system for applying a voltage to each electrode in time division, and displaying and driving, by forming transparent electrodes in a pattern, so as to cross and oppose each other on two substrates across a liquid crystal layer.

In the former method, that is, the active matrix driving system, since nonlinear elements or switching elements such as diodes and thin film transistors must be formed in the liquid crystal cell, the production process of the liquid crystal cell is complicated, and the cost becomes higher.

In the latter method, that is, the direct-multiplexed driving system, since the steepness of the change of optical characteristic of liquid crystal in the vicinity of the threshold of the applied voltage determines the contrast ratio, this point is particularly important in the liquid crystal cell of the TN display mode.

To improve this threshold characteristic, for example, it is proposed to use a liquid crystal cell employing a supertwisted nematic (STN) liquid crystal in which the twisting angle of liquid crystal molecules is 180 to 270 degrees, by a rubbing method, and to use a liquid crystal cell employing a supertwisted birefringence effect (SBE) liquid crystal in which the twisting angle is 270 degrees, by SiO oblique deposition techniques. In liquid crystal cells using these STN liquid crystal and SBE liquid crystal, the change of light transmissivity in the vicinity of threshold of applied voltage is steep, and a high contrast ratio can be obtained even when driving at a high time division, increasing the number of transparent electrodes. Still further, the contrast ratio characteristic with respect to the viewing angle is close to an axis symmetry, as compared with the TN display mode. In liquid crystal cells using these STN and SBE liquid crystal, however, since the birefringence effect of liquid crystal is utilized, the dependency of the light transmissivity on the wavelength is larger than that of the liquid crystal cell of TN display mode. Thus, the problems of light leakage and coloration become more serious when applied in the full color display.

Conventionally, as the method for improving the wavelength dependency of the display characteristic of liquid crystal, various attempts have been made. One example is that of the optical mode interference method for optimizing the optical conditions in mutual relations including the birefringence (difference between refractive index in the direction parallel to the axial direction of liquid crystal molecule and refractive index in the vertical direction), twisting angle of liquid crystal, thickness of liquid crystal layer, spiral pitch of liquid crystal layer, pretilting angle, and angle between the polarization plane of the polarizer and longitudinal axis of adjacent liquid crystal molecules in the STN liquid crystal and SBE liquid crystal. Another method is that of and the so-called guest-host method for preventing light leakage and coloration by absorbing the light transmitting through the liquid crystal layer, even when the liquid crystal is shielded. This is done by adding dichromatic pigments for absorbing light of a specific wavelength to the liquid crystal. In both methods, however, the display is dark and the contrast ratio is not sufficient.

SUMMARY OF THE INVENTION

It is hence a primary object of the invention to solve the above-discussed technical problems, and to present a liquid crystal display apparatus heightened in the contrast ratio while keeping the hitherto level of the display brightness, and further free from light leakage or coloration when the liquid crystal is shielded.

It is another object of the present invention to realize the above mentioned object by a technique of relatively small in space and low in cost, without being accompanied by demerits due to the portableness of the liquid crystal display apparatus due to an increase of weight of the liquid crystal display apparatus, or due to an increase of thickness.

To achieve the above objects, the invention presents a liquid crystal display apparatus comprising:

a liquid crystal display device having a pair of transparent substrates formed, respectively, with electrodes on mutually confronting surfaces of the substrate for, with the liquid crystal placed therebetween;

a first polarizer disposed on one side of the liquid crystal display device;

optical compensating member disposed on the other side of the liquid crystal display device, for varying direction, providing a maximum refractive index along its thickwise direction; and a second polarizer disposed on the opposite side of the liquid crystal display device with respect to the optical compensating member;

longitudinal axes of liquid crystal molecules on the interface of the optical compensating member side of the liquid crystal display device being approximately mutually perpendicular to the direction of maximum refractive index on the interface of the liquid crystal display device side, of the optical compensating member.

In a preferred embodiment, the optical compensating member is made of synthetic resin monoaxially stretched.

In another preferred embodiment, the optical compensating member is made of plural layers, each layer partially connected mutually by heat fuse, the direction of the maximum refractive index of each layer varied and shifted along the thickwise direction, in succession.

In a further preferred embodiment, the shifted direction of the direction of the maximum refractive index of the optical compensating member is mutually opposed to the twisting direction of liquid crystal molecules of the liquid crystal display device.

Preferably, the shifted angle of the direction of the maximum refractive index of the mutually adjacent layers of the optical compensating member is not more than 50 degrees.

Preferably, the optical compensating member is made of single or plural substances selected from a group of polymers of the ethylene series, and polymers of the ester series.

Preferably, the liquid crystal display device is one selected from a group composed of twisted nematic liquid crystal display devices and super twisted nematic liquid crystal display devices.

According to the invention, the liquid crystal display apparatus is composed by the optical compensating member made of a material possessing an optical anisotropy on a liquid crystal display device containing a twisted liquid crystal layer. The twisting angle of this liquid crystal layer is, preferably, 180 degrees or more. Accordingly, the display contrast ratio of the liquid crystal display apparatus is enhanced. The optical compensating member is basically arranged uniformly, for example, in the direction of longitudinal axes of molecules, and is deflected in the reverse direction of the twisting angle of the liquid crystal layer in the thickwise direction.

When the twisting angle of the liquid crystal molecules is selected to be over 180 degrees, it is known that the dependency, of transmitted light of the liquid crystal display device, on the wavelength is large. Thus, with such a liquid crystal display device alone, the light cannot be uniformly switched over the entire wavelength region of visible light. Therefore, in this invention, by combining such liquid crystal display device with an optical compensating member, the problem of wavelength dependency is solved. Thus, light may be switched almost uniformly over the entire region of visible light.

Hence, a liquid crystal display apparatus of high display contrast ratio is obtained. Furthermore, the liquid crystal display apparatus of the invention may be composed of a small size and light weight without sacrificing the portableness of the liquid crystal display apparatus formed in such a lightweight and small-sized structure. Moreover, when the liquid crystal display is realized by selecting the twisting angle of liquid crystal molecules at 180 degrees or more, a high display contrast ratio can be obtained by driving the liquid crystal display device by a multiplex. Therefore, and therefore the production cost of the liquid crystal display apparatus can be held at a relatively low level.

By the present invention, the wavelength dependency of the transmitted light of the liquid crystal cell is eliminated, and the light can be switched uniformly over the entire region of visible light. Further, the optical compensating member for solving the problem of wavelength dependency of transmitted light can be prepared in a relatively small space and at a low cost. Thus, the advantages of the existing liquid crystal display apparatus, such as small size, low cost and portability, will not be sacrificed.

BRIEF DESCRIPTION OF THE DRAWINGS

These and other objects of the invention, as well as the features and advantages thereof, will be better understood and appreciated from the following detailed description taken in conjunction with the drawings, in which.

DETAILED DESCRIPTION OF THE PREFERRED EMBODIMENT

Figure 1:
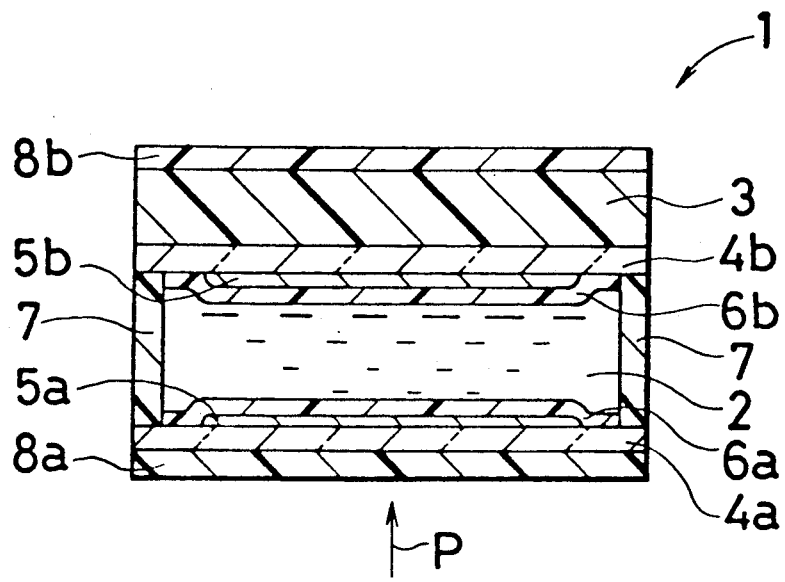
FIG. 1 is a sectional view showing a basic composition of a liquid crystal display panel 1 as one of the embodiments of the invention.

Referring now to the drawings, some of the preferred embodiments of the invention are described in details below.

FIG. 1 is a sectional view showing a basic composition of a liquid crystal display panel 1 as one of the embodiments according to the invention. The liquid crystal display panel 1 possesses a liquid crystal layer 2 and an optical compensating plate 3, in which the light entering, for example, in the direction of arrow P undergoes optical modulation at the liquid crystal layer 2. It then passes through the optical compensating plate 3. Therefore, the wavelength dependency of the optical modulation is eliminated.

The liquid crystal layer 2 is composed by patterning transparent electrodes 5a, 5b on the surfaces of first and second transparent substrates 4a, 4b. Next, orientation films 6a, 6b are formed to cover the surfaces. The transparent substrates 4a, 4b are then disposed spaced by a predetermined distance, so that the orientation films 6a, 6b may face each other. The gap formed is then filed by a sealing material 7 for fixing mutually with liquid crystal. A polarizer 8a is disposed on the surface on the opposite side of the liquid crystal layer 2 of the transparent substrate 4a, and a analyzer 8b is disposed by way of an optical compensating plate 3 on the surface on the opposite side of the liquid crystal layer 2 of the transparent substrate 4b.

In the liquid crystal panel 1, voltage is selectively applied to the transparent electrodes 5a, 5b by a driving circuit (not shown), and accordingly the light entering, for example, in the direction of arrow P in the liquid crystal display panel 1 selectively passes through the liquid crystal display panel 1 corresponding to the display information. More specifically, for example, of the plural display picture elements defined by the combination of transparent electrodes 5a, 5b, the display picture element applied with a voltage become transmissive, while the picture element not applied with voltage becomes shielding, so that the display of the liquid crystal display panel 1 in transparent mode is executed.

In the liquid crystal display panel 1, as the liquid crystal layer 2, a nematic liquid crystal containing optical active substance is used, and as the transparent substrates 4a, 4b, for example, glass or acryl or other material is used as the transparent substrates 4a and 4b. As the transparent electrodes 5a, 5b, transparent conductive films such as ITO (indium-tin oxide) and NESA film are used. Finally, as orientation films 6a, 6b, inorganic films such as $SiO_2$, SiO, or organic films such as polyimide, polyvinyl alcohol, urea resin film, nylon and acryl, are used.

Explained below is the optical compensating plate 3, which is a characteristic constituent element of the liquid crystal display panel 1. As monoaxially stretched thermoplastic films, for example, 6 sheets of HI-MILAN (a tradename of Mitsui-Dupont Poly Chemical) are used, and are overlaid while shifting the stretching direction by, for example, 40 degrees each, in the right twisting direction. These overlaid thermoplastic films (hereinafter called laminate films) are inserted between a pair of glass substrates or transparent organic films. These films are then melted and formed at a temperature about 40° C. higher than the softening temperature of the laminate films (about 120° C.), while applying a pressure about 3 kg/cm$^2$, for about an hour. In this way, an optical compensating plate 3 of about 100 μm in thickness is formed.

Preliminarily, as the liquid crystal material, for example, using ZLI-2293 (manufactured by Merck), the thus prepared optical compensating plate 3 is then overlaid on a supertwisted nematic (STN) liquid crystal display cell possessing the liquid crystal layer 2, twisted 240 degrees to the left. Then, a set of the polarizer 8a and the analyzer 8b is adhered on the outer surface thereof, thereby forming the liquid crystal display panel 1.

What should be noticed here is that the twisting direction of the liquid crystal layer 2 is that of the left direction, while each film of the laminate films are adhered by shifting the stretching direction in the right twisting direction on the whole. In addition, the orientation direction of the liquid crystal molecules of the liquid crystal layer 2, and the direction giving maximum refractive index of the laminate films of the optical compensating plate 3, near the transparent substrate 4b, are arranged nearly perpendicular in a crossing range of ±20 degrees, or more preferably ±10 degrees.

In this embodiment, the retardation values of (Δn·d)s and (Δn·d)f are selected to be 0.9 μm and 0.85 μm, respectively, wherein Δn is the optical anisotropy (birefringence), d is the thickness of the liquid crystal layer 2 and the laminate films, and suffix s and f indicate the liquid crystal layer 2 and the laminate film respectively.

Figure 2:
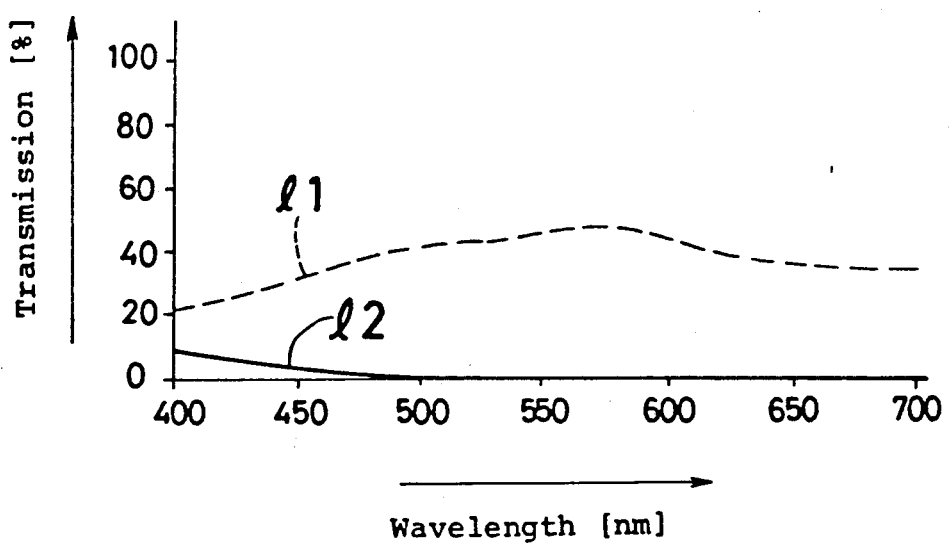
FIG. 2 is a graph showing the dependency of light transmissivity on the wavelength of the incident light of the liquid crystal display panel 1.

FIG. 2 is a graph showing the dependency of the light transmission on the wavelength of the incident light of the liquid crystal display panel 1, fabricated as described herein, as one embodiment of the invention. In FIG. 2, lines 11, 12 denote the light transmission-wavelength relation when 2.5 to 3.0 V, as a threshold voltage, is applied, and when not applied, to the liquid crystal layer 2 respectively. As is clear from FIG. 2, the liquid crystal display panel 1 can present a favorable monochromatic display to nearly the whole region of the wavelengths of visible light (about 380 to 800 nm).

Figure 3:
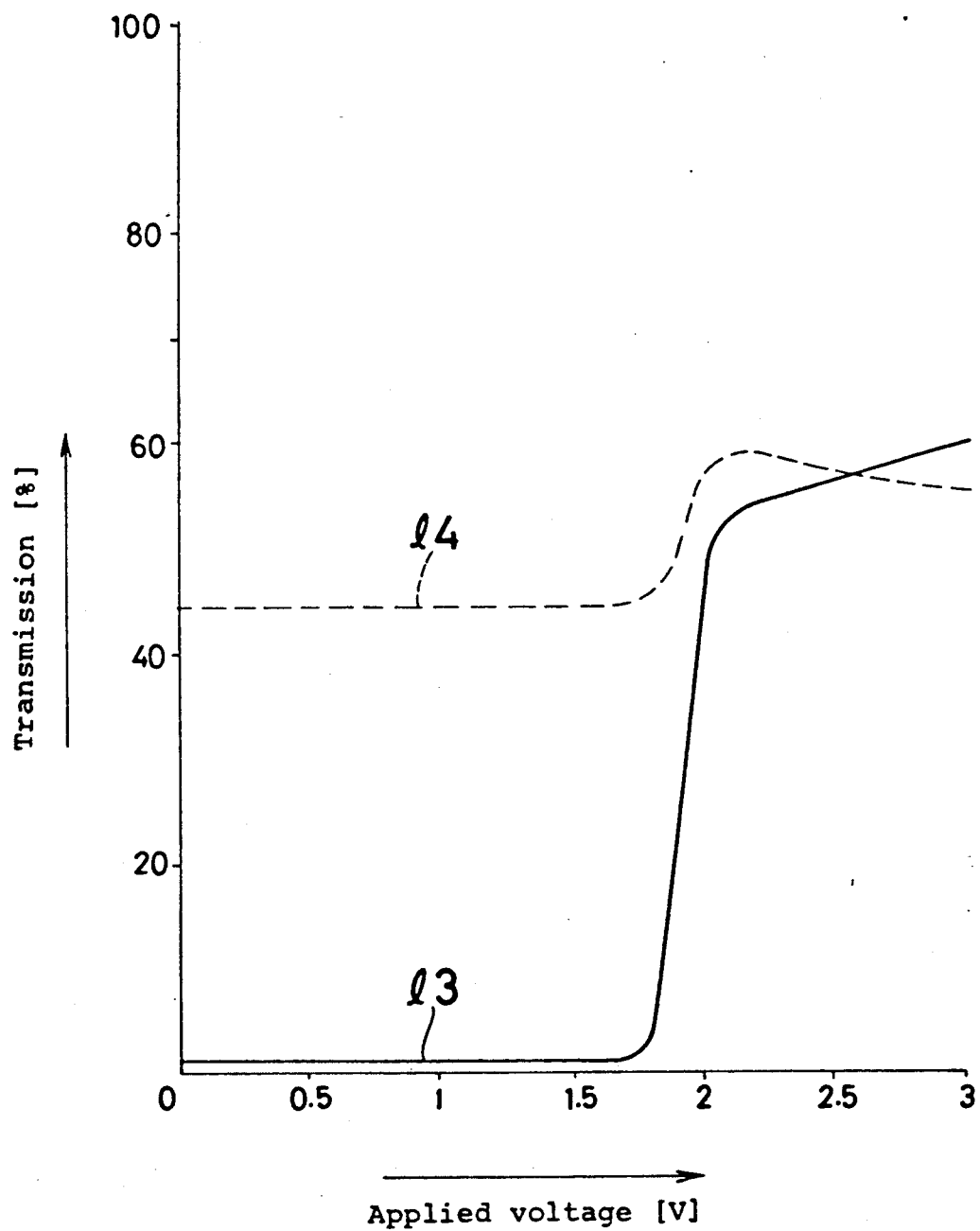
FIG. 3 is a graph showing the relation of light transmission and applied voltage of the liquid crystal display panel 1 having the film adhering direction of the laminate films of an optical compensating plate 3, set in the right twisting direction and left twisting direction on the whole, on a liquid crystal layer 2 having the liquid crystal twisted in the left direction.

FIG. 3 shows a graph comparing the light transmission-applied voltage characteristics of the liquid crystal display panel 1 when the film adhering direction of the laminate films of the optical compensating plate 3 is set in the right and left twisting direction on the whole, with respect to the liquid crystal layer 2 of which the liquid crystal is twisted in the left direction. The light of wavelength 550 nm is applied to the liquid crystal display panel 1. In FIG. 3, lines 13, 14 denote the light transmission-applied voltage relation when the film adhering direction of the laminate films is in the right twisting direction on the whole, and in the left twisting direction, respectively. As is clear from FIG. 3, line 13 has a steep change in the light transmissivity near the threshold value of the applied voltage, while the the change is not so steep in line 14. It has accordingly be determined that, when the liquid crystal layer 2 is twisted in the left direction, it is effective when the film adhering direction of the laminate films of the optical compensating plate 3 is in the right twisting direction, on the whole. Further, as determined from the symmetry, when the twisting direction of the liquid crystal layer 2 is right, it is effective and excellent when the film adhering direction of the laminate films is left, on the whole, as the display characteristic of the liquid crystal display panel 1, as confirmed by the studies of the present inventor.

Figure 4:
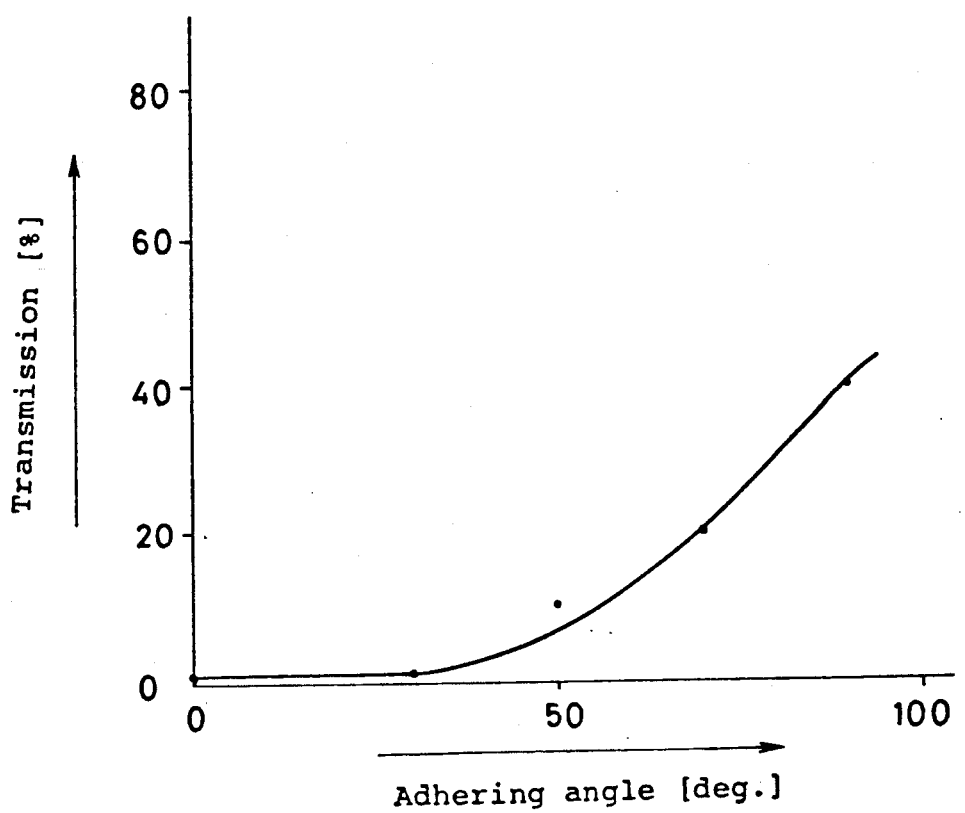
FIG. 4 is a graph showing the relation of light transmission of the liquid crystal display panel 1 when voltage is not applied, with respect to the adhering angle of the laminate films in the liquid crystal display panel 1 composed as normally closed type.

FIG. 4 is a graph showing the relation of the light transmission of the liquid crystal display panel 1 when voltage is not applied, to the adhering angle of laminate films. The light of wavelength 550 nm is applied to the liquid crystal display panel 1. As is understood from FIG. 4, as the adhering angle of the films becomes larger, the light transmission increases. In the case of a liquid crystal display panel 1 of a normally closed type, leakage of light and coloration should not be applied when voltage is not applied to the liquid crystal layer 2. Thus, from FIG. 4, it can be determined that the adhering angle of the laminate films should be preferably 50 degrees most or less.

Figure 5:
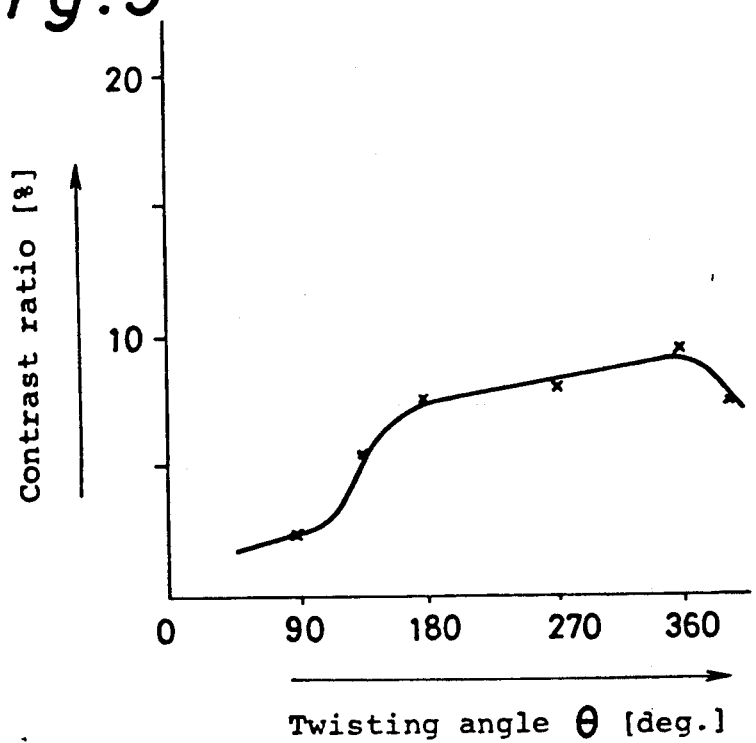
FIG. 5 is a graph showing the relation of the contrast ratio of the liquid crystal display panel 1 with respect to the twisting angle $\theta_1$ of liquid crystal layer 2 and the twisting angle $\theta_2$ as the sum of film adhering angle of the laminate films (provided $\theta_1 = \theta_2 = \theta$)

FIG. 5 is a graph showing the relationship of the contrast ratio of the liquid crystal display panel 1 to the twisting angle $\theta_1$ of liquid crystal layer 2 and the twisting angle $\theta_2$ as the sum of the film adhering angle of laminate films (provided $\theta_1 = \theta_2 = \theta$). In FIG. 5, each twisting angle $\theta_2$ is provided by laminate films consisting of 2 to 7 sheets of film. Considering the relationship of FIG. 5, and seeing that the desired contrast ratio cannot be obtained when the twisting angle $\theta_1$ is over 360 degrees, due to occurrence of domain when the voltage is applied, it can be determined that the twisting angle of the liquid crystal layer 2 and the twisting angle $\theta$ of the laminate films, should be set to be between 180 and 360 degrees in the case of a direct-multiplexed liquid crystal display panel with an extremely large number of scanning lines. Meanwhile, in the case of a direct-multiplexed liquid crystal display panel with a small number of scanning lines (about less than 100 lines) or an active matrix type liquid crystal display panel, it is confirmed by the studies of the present inventor that a sufficient contrast ratio can be obtained when the twisting angle of the liquid crystal layer 2 and twisting angle $\theta$ of the laminate films, are nearly 90 degrees.

It is preferable that the ratio $(\Delta n \cdot d)f/(\Delta n \cdot d)s$ of the retaradation value of the laminate films and that of liquid crystal layer 2 is satisfied with the following formula (1) in consideration of the contrast, as confirmed by the studies of the present inventor.

$$0.7 \mu m \lesssim \frac{(\Delta n \cdot d)f}{(\Delta n \cdot d)s} \lesssim 1.0 \mu m \quad (1)$$

More preferably, the obvious preferable effect is obtained in the range of $$0.85 \mu m \lesssim \frac{(\Delta n \cdot d)f}{(\Delta n \cdot d)s} \lesssim 1.0 \mu m \quad (2)$$

As another embodiment of the liquid crystal display panel 1, as explained below, a monoaxially stretched polycarbonate film may be used as the monoaxially stretched thermoplastic film for the optical compensating plate 3. Six polycarbonate films are overlaid while shifting each by 40 degrees, in the stretching direction to compose laminate films. The laminate films are inserted between a pair of transparent substrates, and are melted and formed at about 190° C. higher than the softening temperature of the laminate films, while applying a pressure for about an hour. Thus, an optical compensating plate 3 of about 100 μm in thickness is prepared. The thus prepared optical compensating plate 3 is overlaid on an STN liquid crystal, cell possessing a liquid crystal layer 2 twisted 240 degrees to the left, the same as the one used in the liquid crystal display panel 1, and a set of a polarizer 8a and an analyzer 8b is adhered on the outer surface thereof so as to be a normally closed type. This thereby makes up a liquid crystal display panel 1 of another embodiment of the present invention.

Figure 6:
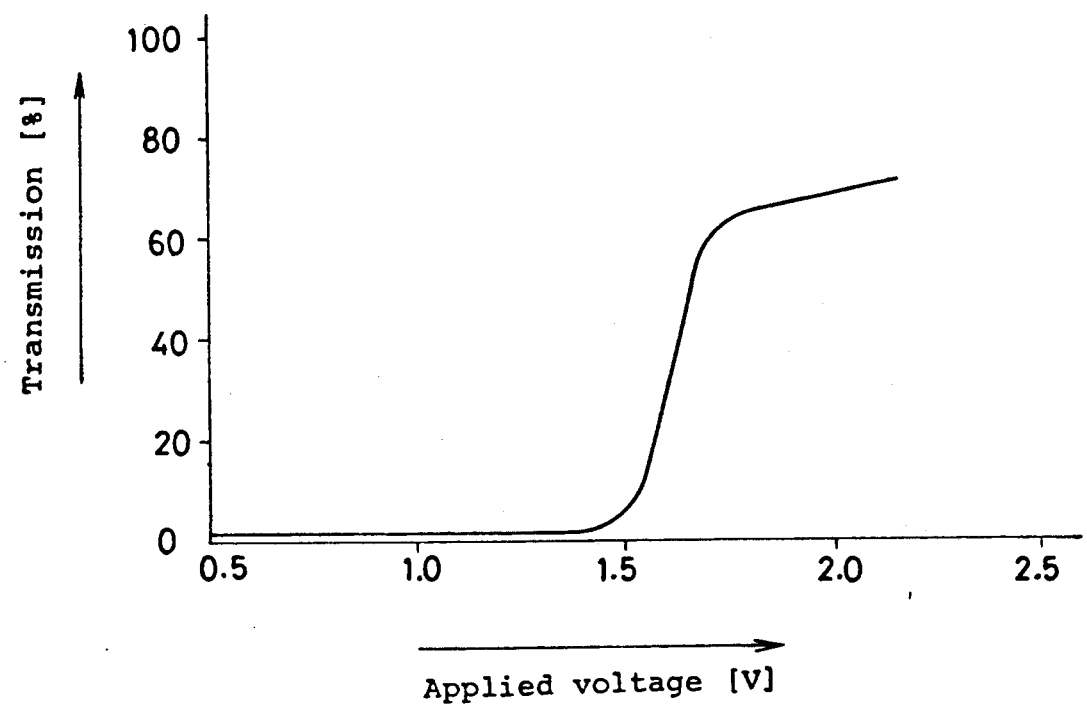
FIG. 6 is a graph showing the relation of light transmission and applied voltage of the liquid crystal display panel as the other embodiment of the invention.

FIG. 6 is a graph showing the light transmission-applied voltage curve of the liquid crystal display panel 1, as another embodiment prepared in this way. As is shown in FIG. 6, the change of the light transmission in the vicinity of threshold value of applied voltage is steep, and hence a high contrast ratio can be obtained.

As the monoaxially stretched thermoplastic film used in the liquid crystal display panel of the invention, aside from the above-mentioned HI-MILAN and polycarbonate films, monoaxially stretched polyethylene film, monoaxially stretched cellulose acetate film, and others may be used. Thus, by fabricating the optical compensating plate 3 by using them, the same effects as the foregoing embodiment and the other embodiment of the present invention can be obtained as confirmed by the studies by the present inventor.

Further, as another embodiment of the present invention, a liquid crystal cell not possessing transparent electrode, for applying voltage to the liquid crystal layer, may be also used as optical compensating plate 3. That is, for example, the STN liquid crystal cell possessing a liquid crystal layer twisted by 240 degrees, as explained in relation to FIG. 1, may be separately composed as an optical compensating plate 3, without patterning the transparent electrode for applying voltage to the liquid crystal layer. The twisting direction of the liquid crystal layer of this STN liquid crystal cell, without an electrode, is set in the reverse direction of the twisting direction of the liquid crystal layer of the other STN liquid crystal display cell for display. Alternatively, when overlaying this STN liquid crystal cell without an electrode on the STN liquid crystal display cell for display, the orientation directions of the liquid crystal molecules of the mutually facing sides of the two liquid crystal cells may be arranged almost perpendicular, in the crossing angle range of ±20 degrees, or preferably within ±10 degrees.

By composing the liquid crystal display panel 1 by using such an STN liquid crystal cell without an electrode as the optical compensating plate 3, the problems of dependency on wavelength of the STN liquid crystal cell for display, and the related light leakage and coloration can be eliminated.

This invention is applicable for the reflective display mode and for the twisted nematic display mode.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description. Further, all changes which come within the meaning and the range of equivalency of the claims are therefore intended to be embraced therein.

What is claimed is:

1. A liquid crystal display apparatus comprising:
    a liquid crystal display device having a pair of transparent substrates formed respectively with an electrode on mutually confronting surfaces of each substrate, with a liquid crystal of supertwisted construction, in which the axial direction of liquid crystal molecules has a twist value of at least 180 degrees, placed therebetween;
    a first polarizer disposed on one side of the liquid crystal display device;
    optical compensating member, disposed on an opposite side of the liquid crystal display device with respect to said first polarizer, formed of a plurality of layers, each layer being twisted in a direction opposed to that of the liquid crystal and having an adherence angle of a value less than a predetermined value of at most 50 degrees, such that a value of the sum of the adherence angles for the plurality of layers is approximately equal to the value twist angle of the liquid crystal, for providing a maximum refractive index along its thickwise direction; and a second polarizer disposed on an opposite side of the optical compensating member, with respect to the liquid crystal display device, such that longitudinal axes of liquid crystal molecules on an interface of the optical compensating member side of the liquid crystal display device are approximately mutually perpendicular to the direction of maximum refractive index of an interface of the liquid crystal display device side of the optical compensating member.

2. A liquid crystal display apparatus as claimed in claim 1 wherein each of the plurality of layers of the optical compensating member is made of a monoaxially stretched synthetic resin.

3. A liquid crystal display apparatus as claimed in claim 2 wherein the optical compensating member is made of a plurality of layers, each layer mutually laminated by heat fusing, the direction of the maximum refractive index of each layer being shifted along the thickwise direction in succession, to yield a total adherence angle approximately equal to the value of the twist angle of the liquid crystal.

4. A liquid crystal display apparatus as claimed in claim 3 wherein the shifted direction of the direction of the maximum refractive index of the optical compensating member, for each of said plurality of layers, is mutually opposed to the twisting direction of liquid crystal molecules of the liquid crystal display device.

5. A liquid crystal display apparatus as claimed in claim 2 wherein the layers of the optical compensating member are made of a single or a plurality of substances selected from the group consisting of polymers of an ethylene series and polymers of an ester series.

* * * * *